Patented June 16, 1936

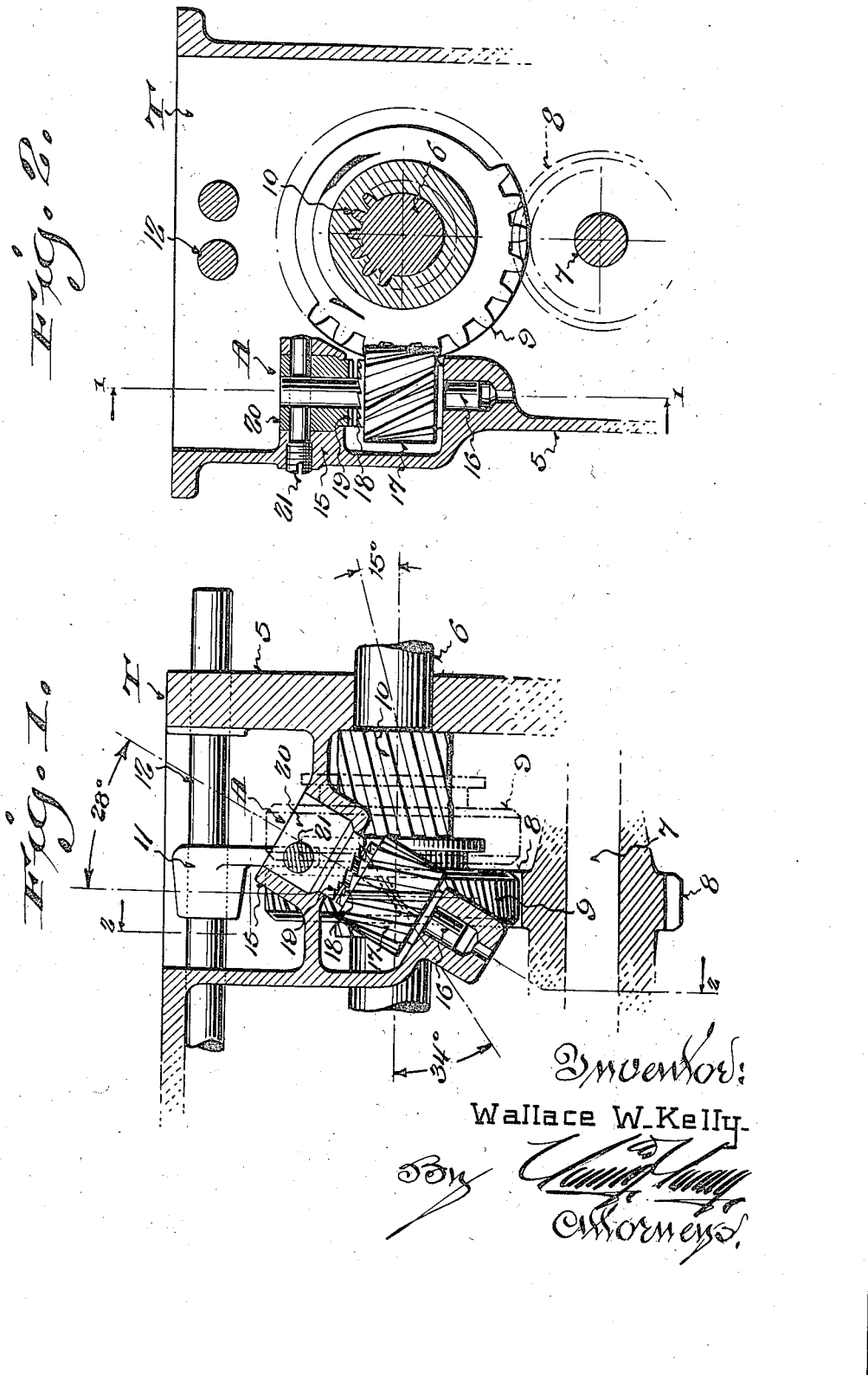

2,044,475

UNITED STATES PATENT OFFICE 2,044,475

VEHICLE REVERSE BRAKE MECHANISM

Wallace W. Kelly, Racine, Wis.

Application October 29, 1934, Serial No. 750,550

6 Claims. (Cl. 192—4)

This invention appertains to motor vehicles, and more particularly to novel means for preventing the inadvertent rolling back of an automobile when the same is stopped on an incline.

Considerable difficulty is experienced by drivers in starting forward after momentarily stopping on a hill for a traffic light or other cause. The vehicle is generally held motionless by the foot brake with the car in low gear, and as soon as the brake is released, the vehicle starts rolling back before the clutch can be let in and the engine speeded up. This results in the stalling of the engine and other difficulties.

Usually the engine is speeded up by the hand throttle, and the foot brake is let off simultaneously with the letting in of the clutch. In most new cars, the hand throttle is entirely eliminated, hence the above mode of starting is impossible, rendering forward starting still more difficult on a hill.

Therefore, one of the salient objects of my invention is to provide means which is rendered automatically operative when the vehicle is in low gear for preventing retrograde movement of the propeller shaft, thereby holding the vehicle against rolling backward, without necessity of operating the foot or hand brake, thus permitting the driver to effectively start his vehicle forward by only manipulation of the clutch and foot accelerator.

Another important object of my invention is the provision of means for preventing a vehicle from rolling back on a hill when the vehicle is in low gear, which is automatically rendered inoperative when the vehicle starts forward, so that re-starting of the vehicle can be easily accomplished without manipulation of any brake levers and the like on the part of the operator.

For a device to meet with the favor of the automotive industry, the same must be of a simple character, absolutely fool-proof and entirely automatic and capable of use with transmissions of standard types.

It is, therefore, a further object of my invention to provide novel means for preventing the rolling back of an automobile on a hill when the same is in low gear, which embodies a minimum number of parts, which is capable of use on vehicles having transmissions of standard types, and which is automatic in operation, requiring no actuation on the part of the operator.

A further object of my invention is to provide an anti-rolling back attachment for automobiles embodying a spiral, or like, gear rotatably mounted within the transmission case and in the path of the sliding gear of the transmission, whereby when the sliding gear is moved into engagement with the low speed gear, the same will mesh with the worm, or like, gear, movement of the sliding gear in one direction causing movement of the spiral, or like, gear into locking engagement with a clutch face on the transmission housing to prevent the rolling back of the vehicle, movement of the sliding gear in the opposite direction causing movement of the spiral, or like, gear away from the clutch face to permit forward movement of the vehicle.

A further object of my invention is the provision of means for arranging the spiral, or like, gear within the transmission housing, whereby the same will only be engaged by the sliding gear when the same is moved to the low speed station, thereby permitting the intentional backing of the vehicle when the sliding gear is moved into its reverse station.

A still further object of my invention is to provide a safety mechanism for automobiles for preventing the rolling back of the vehicle on a hill when the car is in low gear, which will be durable and efficient in use, one that will be simple and easy to manufacture, and one which can be incorporated with an automobile at a low cost.

With these and other objects in view, the invention consists in the novel construction, arrangement and formation of parts, as will be hereinafter more specifically described, claimed and illustrated in the accompanying drawing, in which drawing:—

Figure 1 is a fragmentary longitudinal section through a transmission, showing my improved safety appliance incorporated therewith, the view being taken substantially on the line 1—1 of Figure 2, looking in the direction of the arrows.

Figure 2 is a fragmentary transverse section through the transmission of an automobile, showing my improved device incorporated therewith, the view being taken substantially on the line 2—2 of Figure 1, looking in the direction of the arrows.

Referring to the drawing in detail, wherein similar reference characters designate corresponding parts throughout the several views, the letter T generally indicates a transmission for an automobile, and A my improved safety appliance therefor.

The transmission T can be considered of a type in general use, and the same includes the housing, or casing, 5, supporting the usual forward speed and reverse gears. Rotatably mounted within the housing, or casing, 5 is the drive shaft 6, which is driven through the medium of a clutch (not shown) by the engine of the motor vehicle.

The housing, or casing, also rotatably supports the counter-shaft 7, which has thereon, for movement therewith, the low speed gear 8. As in the ordinary construction, the shaft 7 has affixed thereto, in rear of the low speed gear 8, the reverse gear (not shown) which meshes with the reverse idler gear.

Only sufficient parts of the transmission have been illustrated to show the use of my safety appliance A, hence the reverse and other gears have not been shown, in that my appliance is only brought into play when the sliding gear 9 is brought into mesh with the low speed gear 8.

The sliding gear 9 is of the helical type, and is preferably splined on the shaft 6 by spiral ribs 10, whereby, when the gear 9 is moved forwardly, the same will be slightly turned to facilitate the meshing of the teeth thereof with the low speed gear 8 and my appliance A, which will be described in detail.

The gear 9 is shifted in the conventional manner through the use of the shift yoke 11 and a shift rod 12.

In accordance with my invention, I mount my appliance A directly within the transmission casing, or housing, 5, and, if preferred, one wall of the housing 5 can have formed thereon suitable supports 15 for receiving the appliance A.

The appliance A includes a supporting shaft 16 located, in the present instance, at one side of the sliding gear 9, and this shaft is firmly mounted in the supports 15 heretofore referred to. Slidably and rotatably mounted on the shaft 16 for free movement is a spiral, or like, safety gear 17, and, as shown, the upper face of this gear has formed thereon a clutch face, or section, 18. A similar clutch face, or section, 19 is carried by the transmission casing, and the clutch face, or section, 19 is preferably formed of hard metal, and in the present instance I have shown the same formed on a collar, or sleeve, 20 which surrounds the shaft 16. The shaft and the collar 20 can be securely locked together and fastened to the transmission casing in any desired manner, such as by the use of a key 21.

The safety gear 17 is so located that when the sliding gear 9 is moved forward into meshing engagement with the low speed gear 8, the same will mesh with the gear 17. However, when the sliding gear 9 is moved into neutral, as shown in dotted lines, the same will be out of mesh with the safety gear 17, and hence free of the same. Likewise, when the sliding gear 9 is moved farther back into its reverse position, the same is out of mesh with the gear 17, and intentional backing of the vehicle is permitted.

In use of my improved device A, when the vehicle is stopped on a hill, the driver of the vehicle shifts into low gear, and consequently the sliding gear 9 is moved forwardly into meshing engagement both with the low gear 8 and the safety gear 17. As the sliding gear 9 moves forwardly, the same is slightly turned on its shaft 6, as heretofore described, which facilitates the meshing of the gear 9 with the gears 8 and 17.

If the vehicle tends to roll backward, the gear 9 will rotate in a reverse direction and in a clockwise direction (referring to Figure 2 of the drawing). This movement will rotate the safety gear 17 and thrust the same up on its shaft 16, causing engagement of the clutch sections, or faces, 18 and 19. Thus, further movement of the gear 9 in a clockwise direction will be prevented, and the vehicle will be effectively and safely held from rolling backward.

When the vehicle is started forward, the shaft 6 will rotate in a counter-clockwise direction (referring to Figure 2), and the safety gear 17 will be rotated and will be carried away from the clutch face 19, thus immediately releasing the gear from its locked position, and instant forward movement of the vehicle is permitted.

The safety gear 17 normally tends to move away from the clutch face 19 by gravity, hence releasing of the clutch faces is assured. Obviously, if, for any reason, the gear 17 should stick on its shaft against sliding movement, the pitch of the teeth of the clutch sections 18 and 19 will throw the gear away from the stationary clutch section 19.

I can, of course, employ a spring or like element for holding the safety gear normally in a free position, without departing from the spirit or the scope of my invention.

The shaft 16 and the safety gear 17 are preferably arranged at a slight angle to the vertical, so as to facilitate the meshing of the spiral gear 9 therewith when the spiral gear 9 is moved forward into its low speed station.

From the foregoing description, it can be seen that I have provided an exceptionally simple and durable device for effectively preventing the rolling back of a vehicle on an incline, which will materially aid in the safe operation of the vehicle.

The improved safety appliance A is so designed as to permit the effective use thereof with vehicles having automatic clutches.

The design of the safety appliance A is such as to effectively hold the shift gear 9 in its first speed station against accidental rearward movement when the vehicle is moving forward down a grade, and when the engine is being used as a brake.

Changes in details may be made without departing from the spirit or the scope of this invention, but what I claim as new is:—

1. The combination with a transmission, including a low forward speed gear, a sliding gear, and means for moving the sliding gear into and out of meshing engagement with the low forward gear, of an automatic device for preventing a vehicle rolling back down a hill comprising, a safety gear located adjacent to the low forward gear and in the path of the sliding gear for meshing engagement therewith when the sliding gear is in engagement with the low forward gear, means slidably and rotatably supporting the safety gear, and clutch faces carried respectively by the safety gear and the transmission.

2. In a transmission mechanism for power-driven vehicles, safety means associated with the transmission mechanism for preventing retrograde movement of the vehicle including a clutch having stationary and movable faces, means operative when the transmission is in its low forward gear only for causing the movable face to engage the stationary face when the vehicle tends to roll backwards.

3. In a transmission mechanism for power-driven vehicles including a stationary casing and a forward speed shift gear, means associated with the transmission for preventing retrograde movement of the vehicle including a spiral gear having a clutch face and a stationary clutch face at one side of the spiral gear associated with the casing, and means for rotating the gear and moving the clutch face thereof in engagement with the stationary clutch face when the speed gear is shifted into its forward speed station and in engagement with the spiral gear and when the vehicle tends to roll rearwardly.

4. The combination with a transmission for power-driven vehicles, a casing, a low forward gear in the casing, a sliding gear in the casing, and means for moving the sliding gear into and out of engagement with the low forward gear, of a part for the transmission for preventing the inadvertent rolling back of the vehicle on an incline comprising, a safety gear in the casing disposed adjacent to the low forward gear and in the path of the sliding gear for meshing engagement therewith when the sliding gear is in engagement with the low forward gear, a stationary shaft slidably and rotatably supporting the safety gear, a clutch face on the safety gear, a stationary clutch face at one end of the shaft, rotating movement of the sliding gear in one direction normally carrying the safety gear away from the stationary clutch section, and rotating movement of the sliding gear in a reverse direction normally thrusting the safety gear toward the stationary clutch section.

5. In a transmission mechanism for power-driven vehicles including a casing and a forward speed gear, a sliding gear, and means moving the sliding gear into and out of meshing engagement with the forward speed gear; of an automatic device for preventing the vehicle from rolling back down an incline comprising a safety gear disposed in the path of the sliding gear for meshing engagement therewith when the sliding gear is in meshing engagement with the forward speed gear, a lock for the safety gear, and means slidably and rotatably mounting the safety gear, the safety gear being movable into engagement with the lock by the sliding gear when the same rotates in one direction.

6. In a motor-driven vehicle, a transmission including a shiftable forward speed gear having spiral teeth, and safety means associated with the transmission for preventing retrograde movement of the vehicle when the speed gear is in its low forward speed station only.

WALLACE W. KELLY.